US006698575B2

(12) United States Patent
Gartner

(10) Patent No.: US 6,698,575 B2
(45) Date of Patent: Mar. 2, 2004

(54) INSTALLATION FOR TRANSPORTING OBJECTS ON CONVEYING PATHS BY MEANS OF A CONVEYING-COMB-DRIVEN TRANSPORTING ROLLER

(76) Inventor: Franz Gartner, Muhlweg 10, 97656 Oberelsbach (DE)

( * ) Notice: Subject to any disclaimer, the term of this patent is extended or adjusted under 35 U.S.C. 154(b) by 19 days.

(21) Appl. No.: 10/146,666

(22) Filed: May 14, 2002

(65) Prior Publication Data

US 2003/0000806 A1 Jan. 2, 2003

(30) Foreign Application Priority Data

May 15, 2001 (DE) .......................... 101 23 598

(51) Int. Cl.⁷ .......................... B65G 29/00; B65G 17/32
(52) U.S. Cl. .................. 198/465.4; 198/685; 198/833
(58) Field of Search .................. 198/465.4, 683, 198/685, 833

(56) References Cited

U.S. PATENT DOCUMENTS

| 3,844,406 | A | * | 10/1974 | Kornylak .................. 198/685 |
| 5,456,346 | A | * | 10/1995 | Schilling et al. |
| 6,206,178 | B1 | * | 3/2001 | Jacobson |
| 6,293,384 | B1 | * | 9/2001 | Gartner .................. 193/37 |
| 6,460,685 | B1 | * | 10/2002 | Johansson et al. ....... 198/465.4 |

* cited by examiner

*Primary Examiner*—Richard Ridley
(74) *Attorney, Agent, or Firm*—Goodman & Teitelbaum, Esqs.

(57) ABSTRACT

An installation for transporting objects, in particular items of clothing hanging on clothes hangers, on conveying paths of a transporting roller, in particular a roller having two parallel spaced-apart flanges on end sides thereof and a central part located therebetween, as well as a through-passage opening extending through a center thereof disposed between the flanges and the central part. The central part has at least one peripheral, annular circumferential part which can rotate separately from the two flanges, so that when the circumferential part rotates as a result of bearing on one of the conveying paths, the two flanges remain in a rest state irrespective of the rotation of the circumferential part. A hook-like carrier element is provided for an object which is to be transported, passing through the through-passage opening and projecting from the latter by way of its free end. The conveying path includes a fixed rolling ridge with a transporting-roller running track on its top side, so that the transporting roller rides on the rolling ridge with the two flanges of the transporting roller engaging laterally around the rolling ridge, and with the circumferential part of the transporting roller engaging the transporting-roller running track. A comb-like conveying mechanism is guided along the rolling ridge, spaced apart laterally from the same at least corresponding to the thickness of the flange projecting there. The comb-like conveying mechanism is provided with gaps which are dimensioned for engagement with the free end of the hook-like carrier element.

11 Claims, 7 Drawing Sheets

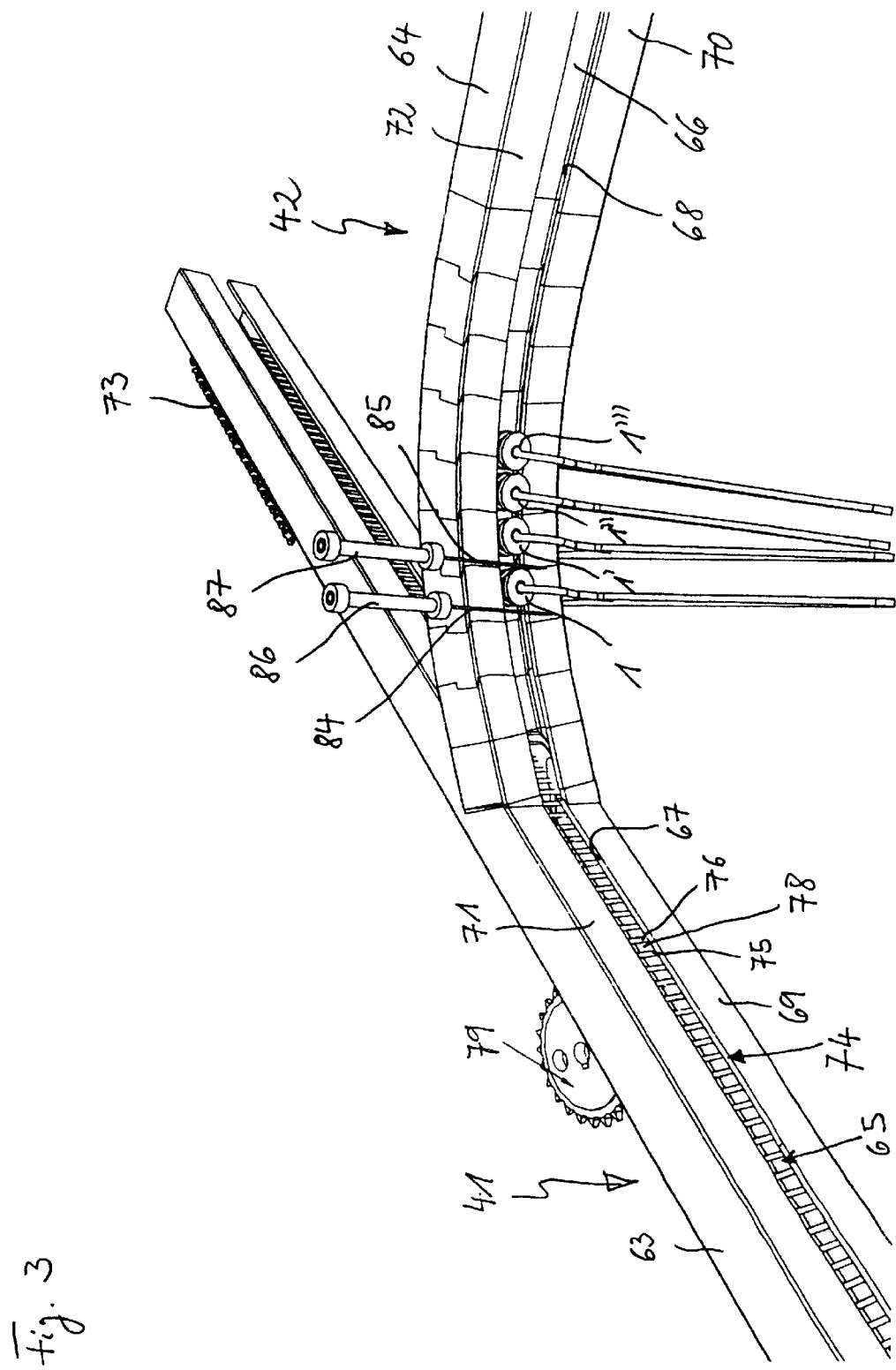

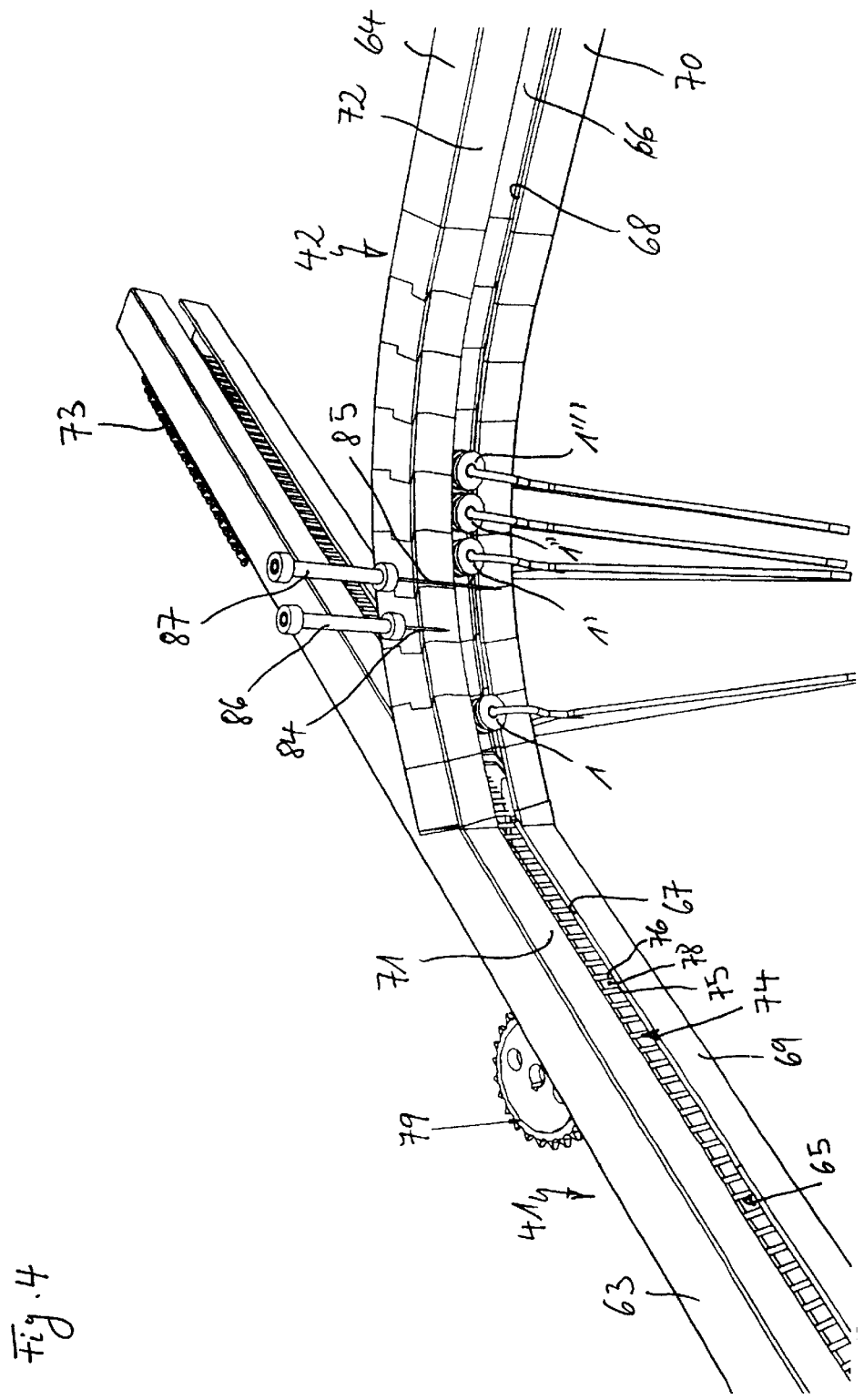

INSTALLATION FOR TRANSPORTING OBJECTS ON CONVEYING PATHS BY MEANS OF A CONVEYING-COMB-DRIVEN TRANSPORTING ROLLER

BACKGROUND OF THE INVENTION

The invention relates to an installation for transporting objects, in particular items of clothing hanging on clothes hangers.

Such installations transport the objects on conveying paths by means of a transporting roller, containing two parallel spaced-apart flanges on the end sides and a central part located therebetween as well as a through-passage opening leading through the center between the flanges and the central part, the central part having at least one peripheral, annular circumferential part which can rotate separately from the two flanges, and the two flanges being connected to one another and to the circumferential part such that, in the case of the circumferential part rotating as a result of bearing on the conveying path, the two flanges are in a rest state irrespective of the rotation, a hook-like carrier element for an object which is to be transported passing through the through-passage opening and projecting from the latter by way of its free end.

The transporting roller of the abovementioned transporting installation is known from EP 10 13 569 A1 and is designed in order to avoid the smoothing effect which arises with a build-up of at least two transporting rollers.

BRIEF SUMMARY OF THE INVENTION

It is an object of the present invention to provide an installation which is intended for transporting objects of the type mentioned below and ensures, by straightforward means, the reliable transportation of objects which are to be transported on conveying paths.

Accordingly, the invention provides that the conveying path comprises a fixed rolling ridge with a transporting-roller running track on its top side, the transporting roller riding on the rolling ridge, the two flanges of the transporting roller engaging laterally around the rolling ridge, and the circumferential part of the transporting roller engaging with transporter-roller running track, and that guided along the rolling ridge, spaced apart laterally from the same at least corresponding to the thickness of the flange projecting there, is a comb-like conveying mechanism, of which the gaps or clearances are dimensioned for the engagement of the free end of the hook-like carrier element.

This manner of transporting-roller movement allows a straightforward design of the transporting means for the transporting roller in the form of a comb-like conveying mechanism which can be moved along the conveying path and in the gaps of which the free end of the hook-like carrier element for the goods which are to be transported can be accommodated in order for the transporting roller to be carried along.

The comb-like conveying mechanism is advantageously connected to a link chain running parallel to the conveying path, in particular a laterally curved chain of a drive arrangement.

The comb-like conveying mechanism preferably comprises tines in the form of regularly spaced-apart carry-along pins which extend perpendicularly to the through-passage opening of the transporting roller and perpendicularly to the transporting-roller running track, in order to provide the highest possible clearance for the reliable engagement of the free end of the hook-like carrier element.

According to a particularly advantageous development of the invention, the rolling ridge, provided by the transporting-roller running track, is formed as part of a profile rail, in which the link chain is guided.

This profile rail preferably has a generally C-shaped cross section, an upwardly oriented edge of the C-profile rail forming the transporting-roller running track.

The comb-like conveying mechanism preferably spans to the full extent, by way of its tines, the gap between the mutually facing edges of the C-profile rail for the purposes of providing a clearance which is bounded at the top and bottom, in order for the free end of the hook-like carrier element, and thus the transporting roller, to be reliably secured throughout the conveying displacement.

An advantageous development of the invention provides that the installation has a location for supplying or introducing the transporting roller(s) into the conveying path, having a downwardly sloping section which opens out laterally into the conveying path and comprises a fixed rolling ridge with a transporting-roller running track on its top side, said rolling ridge opening out into the rolling ridge of the conveying path, there being provided in the downwardly sloping section, on which the transporting roller(s) is or are conveyed to the conveying path by the action of gravitational force, an arrangement for restraining the transporting roller(s), which can be released synchronously with the presence of a gap of the conveying mechanism in the supply location, with account being taken of the period of time taken for the respective transporting roller to come into contact with this gap.

This object is achieved by the features set forth below. Advantageous developments of the invention are also specified below.

At this introduction location, or generally in the case of diverters which open out into the conveying path, the gap sequence of the conveying mechanism is coordinated with the timing of the respective diverter. Provided for this purpose is a corresponding clock generator, for example in the form of a gearwheel, which engages in the gaps of the comb-like conveying mechanism, or the spaced-apart tines thereof, and controls the diverter in a correspondingly synchronous manner.

The restraining arrangement at the abovementioned location for introducing transporting rollers into the conveying path preferably comprises a restraining pin for releasing a leading transporting roller and a further restraining pin for restraining trailing transporting rollers, it being possible for the restraining pins to be moved in the direction of their longitudinal axes between a restraining position in front of the respective transporting roller and a release position, in which they are disengaged from the respective transporting roller. The restraining pins can preferably be moved essentially perpendicularly to the transporting-roller running track of the downwardly sloping section.

The invention further provides that the conveying path comprises at least one ejecting location or discharging line which branches off from it and has a downwardly sloping section, which has a fixed rolling ridge with a transporting-roller running track on its top side and on which the transporting roller(s) is or are conveyed to a collecting location by the action of gravitational force, the ejecting location comprising a diverter which can optionally be brought up to the conveying path in order to transfer the transporting roller(s) to the downwardly sloping section of the ejecting location, with the free end of the hook-like carrier element passing through the through-passage opening thereof, being disengaged in the process.

BRIEF DESCRIPTION OF THE SEVERAL VIEWS OF THE DRAWINGS

The invention is explained in more detail, by way of example, hereinbelow, with reference to the drawing, in which:

FIGS. 3 to 5 show an embodiment of the introduction location at which items of clothing hanging on clothes hangers are introduced into the conveying path of the installation of FIGS. 1 and 2, FIG. 3 showing a leading transporting roller being separated off from trailing transporting rollers, FIG. 4 showing the transfer of the transporting roller separated according to FIG. 3, and FIG. 5 showing the beginning of the next separating operation once the leading transporting roller has been transferred.

DETAILED DESCRIPTION OF THE INVENTION

Since the conveying principle according to the invention of an installation for transporting objects is based on a specifically configured transporting roller with fixed side parts and a rotatable annular part in the center, this transporting roller, which is described in more detail, for example, in EP 1 013 569 A1, will be explained in more detail hereinbelow with reference to FIGS. 7, 8 and 9, in which the same parts with the same functions have the same designations.

Figures 7, 8:
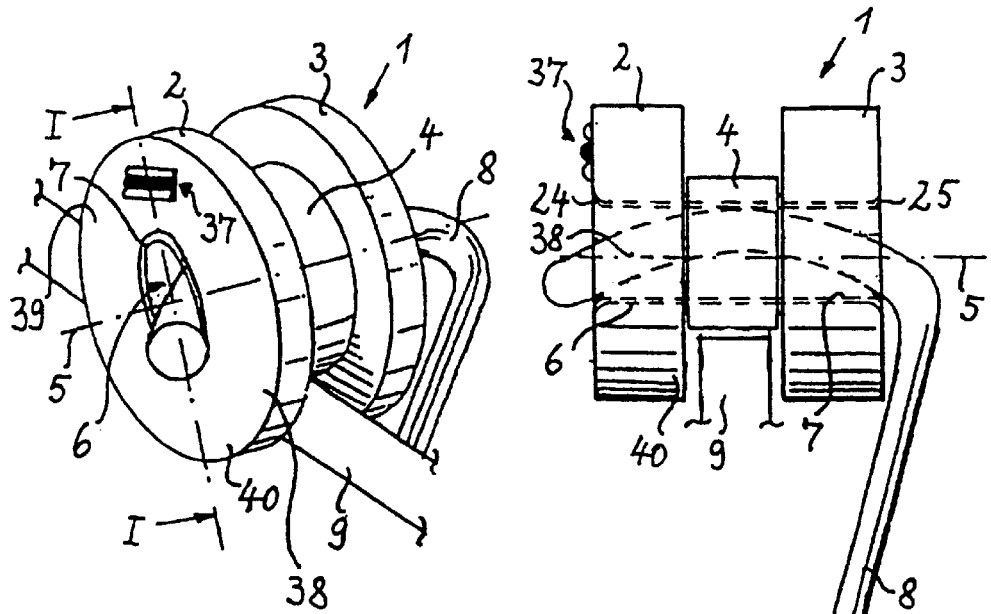
FIG. 7 shows a schematic perspective illustration of a transporting roller of the installation of FIGS. 1 and 2 on the conveying ridge of the conveying path of the installation.
FIG. 8 shows a front view of the transporting roller from FIG. 7 in the direction transverse to the conveying path.

In FIGS. 7 and 8, the transporting roller 1 essentially comprises two parallel disk-like outer flanges 2, 3 on the end sides in each case, the elements referred to above as fixed side parts, and a central part 4 located therebetween, the element referred to above as a rotary annular part. Provided along the associated center axis 5 is a through-passage opening 6, in which a securing part 7 is optionally located. The transporting roller 1 is connected, via its through-passage opening 6, to an arcuate carrier element or hook 8 of a hanger, on which items of clothing are conveyed in the transporting installation in question. For this purpose, the central part 4 of the transporting roller 1 bears on a rolling ridge, which will be explained in more detail at a later stage in the text, of a conveying path of the transporting installation, the inclination of the same making it possible for the transporting roller 1 to move.

As can be gathered from FIG. 8, the carrier element 8, in the form of a clothes-hanger hook, bears on the ends of the securing-part 7 in each case. The securing part 7 is a hollow-cylindrical bushing, of which the end regions are bent outward in each case by riveting 24, 25.

The inner construction of the transporting roller 1 cannot readily be seen from FIGS. 7 and 8. The transporting roller 1 is thus shown in section in FIG. 9. The central part 4, which is located between the first flange 3 and the second flange 2, has an annular web 11, which forms part of the first disk-like flange 3, is directed towards the second flange 2, is extended on one side and has a central bore as through-passage opening 6 of standard diameter. The annular web 11 has a slightly inclined outer surface from its point of attachment to the first flange 3 to its free end region 20, which is flattened perpendicularly to the center axis 5. The slightly inclined outer surface of the annular web 11, at the same time, constitutes the inner running surface 12 for the rolling bodies 13, 14 of a rolling-contact bearing. A multiplicity of rolling bodies are usually necessary for a reliably functioning rolling-contact bearing. The inner running surface 12 has, in the center, an encircling groove-like depression 18, which is adapted in an accurately dimensioned manner to the outer surfaces of the rolling body 13, 14 and in which the rolling bodies 13, 14 can move. On the outside, the rotatable circumferential part 15, in the form of an outer ring, encloses the rolling bodies 13, 14 at a radial distance from the inner running surface 12, and it has a disk-like side wall 21 which is angled perpendicularly to the center axis 5 and is located on the smaller-diameter side of the annular web 11. In the direction of the side of the larger annular-web diameter or of the first flange 3, the outer ring 15 is preferably open, inter alia for assembly reasons. The outer ring 15 is provided in each case with a slight amount of slot-induced play 16, 17 in relation to the inner surfaces 23, 22 of the first and of the second flanges 3, 2. On its paraxial inner running surface 10, the outer ring 15 may likewise contain an encircling groove-like depression 19, which is likewise adapted to the surfaces of the rolling body 13, 14.

The second disk-like flange 2 is firmly secured against the free flattened end region 20 of the annular web 11 by the securing part 7, the securing part 7 pressing the second flange 2 onto the end region 20 of the annular web 11 by rigid riveting 24, 25. The hollow-cylindrical securing part 7 has formed through it a channel 26, into which the hook 8 of a clothes hanger is introduced and pushed through until that position of the hook 8 which is shown in FIG. 8 is reached.

In the simplest case (FIGS. 7 and 8), the second flange 2 may be provided with barcodings 37.

Figure 9:
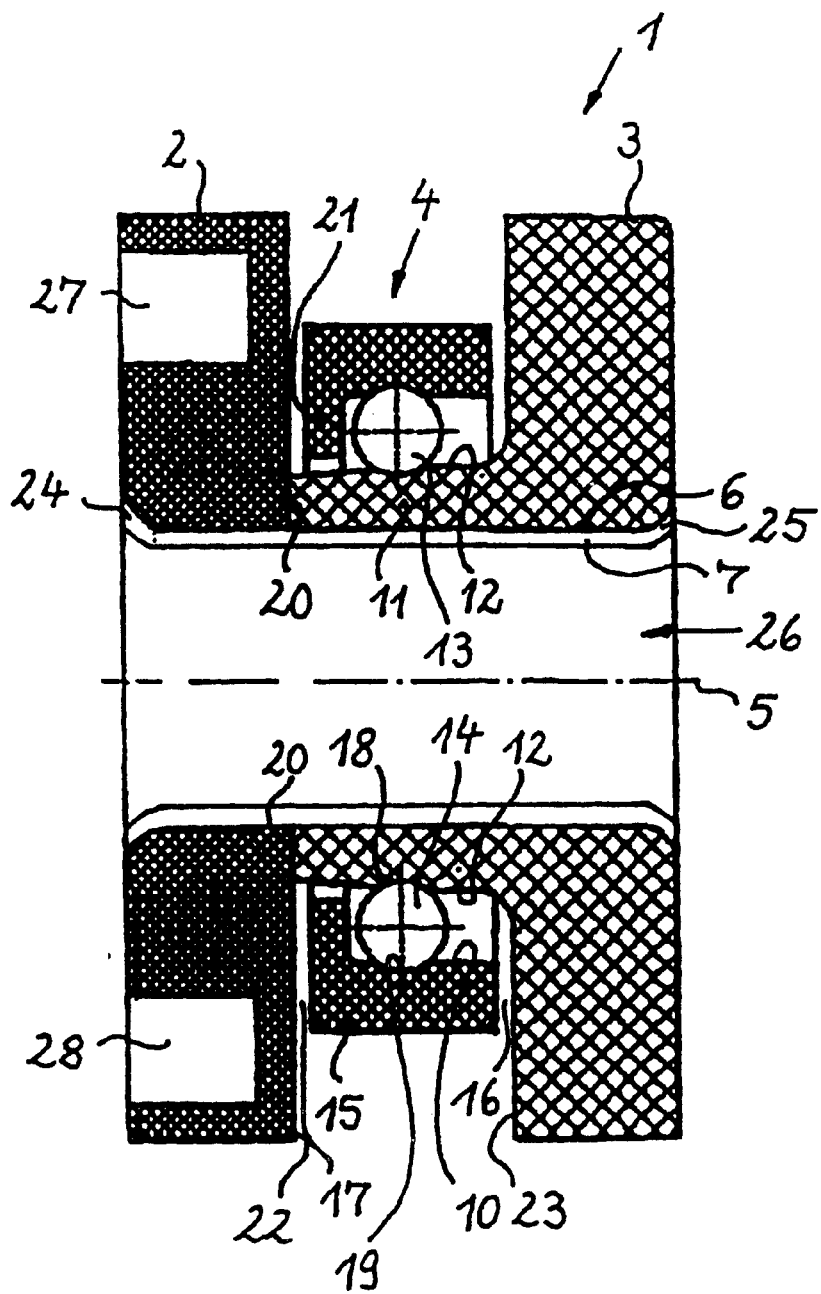
FIG. 9 shows a cross section through the transporting roller along line I—I from FIG. 7 without the carrier element, conveying path and barcoding, but with cutouts and a securing part.

In FIG. 9, the second disk-like flange 2 has hole-like cutouts 27, 28 in which, instead of the barcodings 37 shown in FIGS. 7 and 8, coding arrangements having electrical and electronic components (these arrangements not being shown) can be fastened. The coding arrangements may be, for example, radially or circularly arranged inductive, magnetic and/or capacitive arrangements or pins, made of a material differing from the flange material, in order for it to be possible to gather the storage information therefrom. The cutouts 27, 28, however, may also constitute an annular groove in which it is possible to secure electrical components, coupled with ROM and/or RAM memory modules, which have been introduced therein.

As can be gathered from FIGS. 7 to 9, in the transporting roller 1, the central part 4 in other words has at least one peripheral annular circumferential part 15 which can be rotated separately from the two flanges 2, 3, the two flanges 2, 3 being connected to one another and to the circumferential part 15 such that, in the case of the circumferential part 15 rotating as a result of bearing on the conveying path, the two flanges 2, 3 are in a rest state irrespective of the rotation. This configuration of the transporting roller is the basis for the design according to the invention, which will be explained hereinbelow, of the transporting installation for transporting, in particular, items of clothing hanging on clothes hangers. In particular, this transporting roller, with fixed outer elements and a rotating inner element, allows a transporting means or a pushing arrangement to act directly on the transporting roller. A corresponding transporting installation will be explained hereinbelow with reference to FIGS. 1 to 6.

Figure 2:
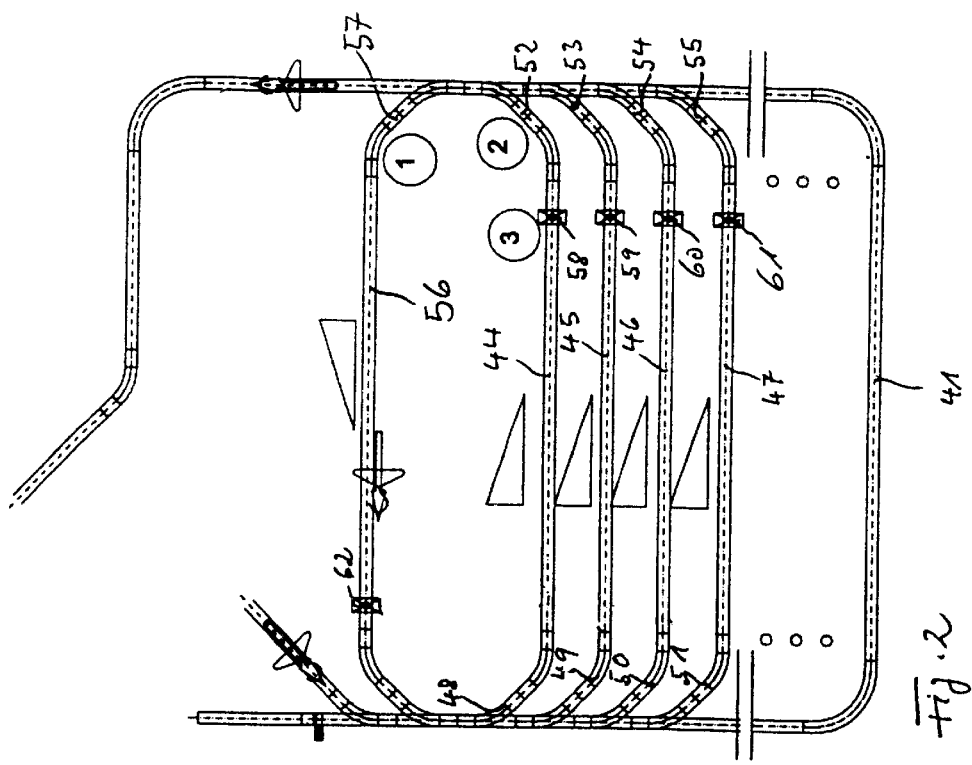
FIG. 2 shows, schematically, an embodiment of an installation for transporting items of clothing hanging on clothes hangers, with two-stage sorting.
Figure 1:
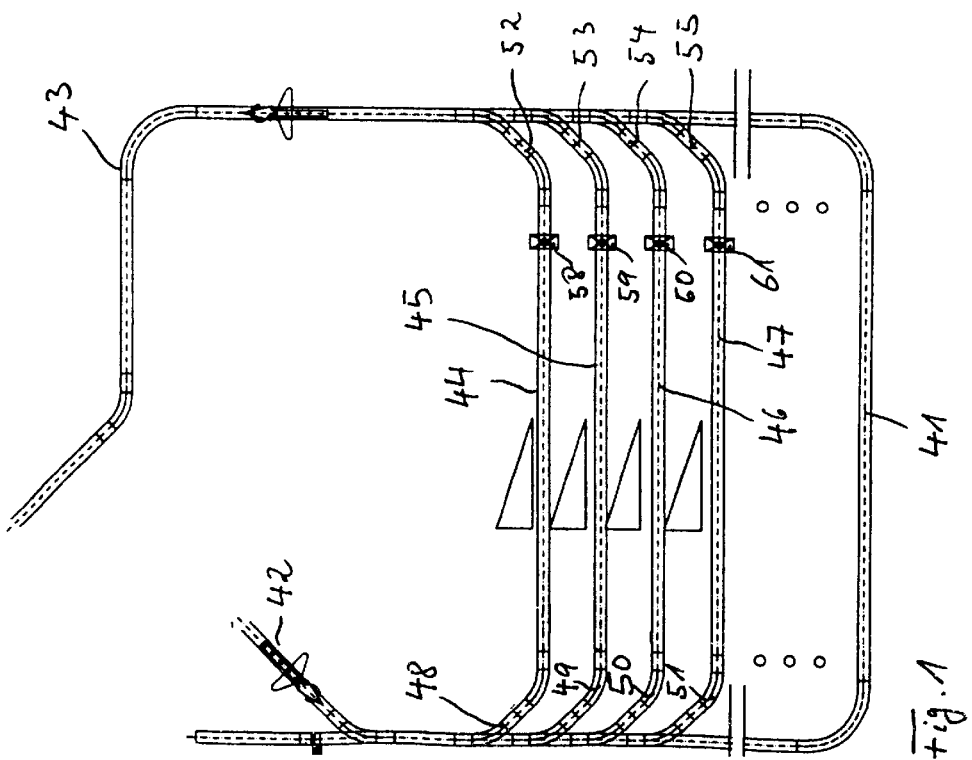
FIG. 1 shows, schematically, an embodiment of an installation for transporting items of clothing hanging on clothes hangers with single-stage sorting.

FIGS. 1 and 2 show, schematically, in general terms, two embodiments of the arrangement according to the invention for transporting, in particular, items of clothing hanging on clothes hangers, the installation according to FIG. 1 being provided for single-stage sorting, while the installation according to FIG. 2 is provided for two-stage sorting.

The transporting installation shown in FIG. 1 comprises an open-circuit conveying path 41 with a supply location 42 at one end for unsorted goods and with an end 43 for the removal of sorted goods. Provided between the supply location 42 and the removal end 43 of the conveying path 41 are a plurality of parallel discharging lines, of which merely four discharging lines 44 to 47 are illustrated in FIG. 1. The discharging lines 44 to 47, on the inlet side, branch off from the conveying path 41 via diverters 48 to 51. On the outlet side, the discharging lines 44 to 47 pass over into the conveying path 41 again via diverters 52 to 55. Between their inlet and their outlet, the discharging lines 44 to 47 are each provided with a downwardly sloping section, in order to transfer the incoming goods to the outlet-side diverters 52 to 55 on account of the gravitational force thereof. The discharging lines provide a sorting means which is referred to here as being single-stage because the goods only pass through one or more of the discharging lines once.

In contrast to this, FIG. 2 shows a modified design of the transporting installation of FIG. 1, with two-stage sorting of goods. In addition to the design with a plurality of discharging lines which is shown in FIG. 1, the transporting installation according to FIG. 2 comprises a return line 56, which is connected to the conveying path 41, via an inlet diverter 57, downstream of the discharging lines 44 to 47. In addition, the return line 56 is connected to the conveying path 41 upstream of the discharging lines 44 to 47 and downstream of the supply location 42. For the purposes of transporting goods, the return line 46 likewise comprises a downwardly sloping section, which runs in the opposite direction to the downwardly sloping sections of the discharging lines 44 to 47.

Formed at the end of each discharging line 44 to 47 is a collecting location or a transfer station 58, by means of which goods coming in via the discharging lines 44 to 47 are collected and can be introduced into the conveying path 41 again in a specific manner. A similar collecting location 62 is located at the end of the return line 56.

Figure 5:
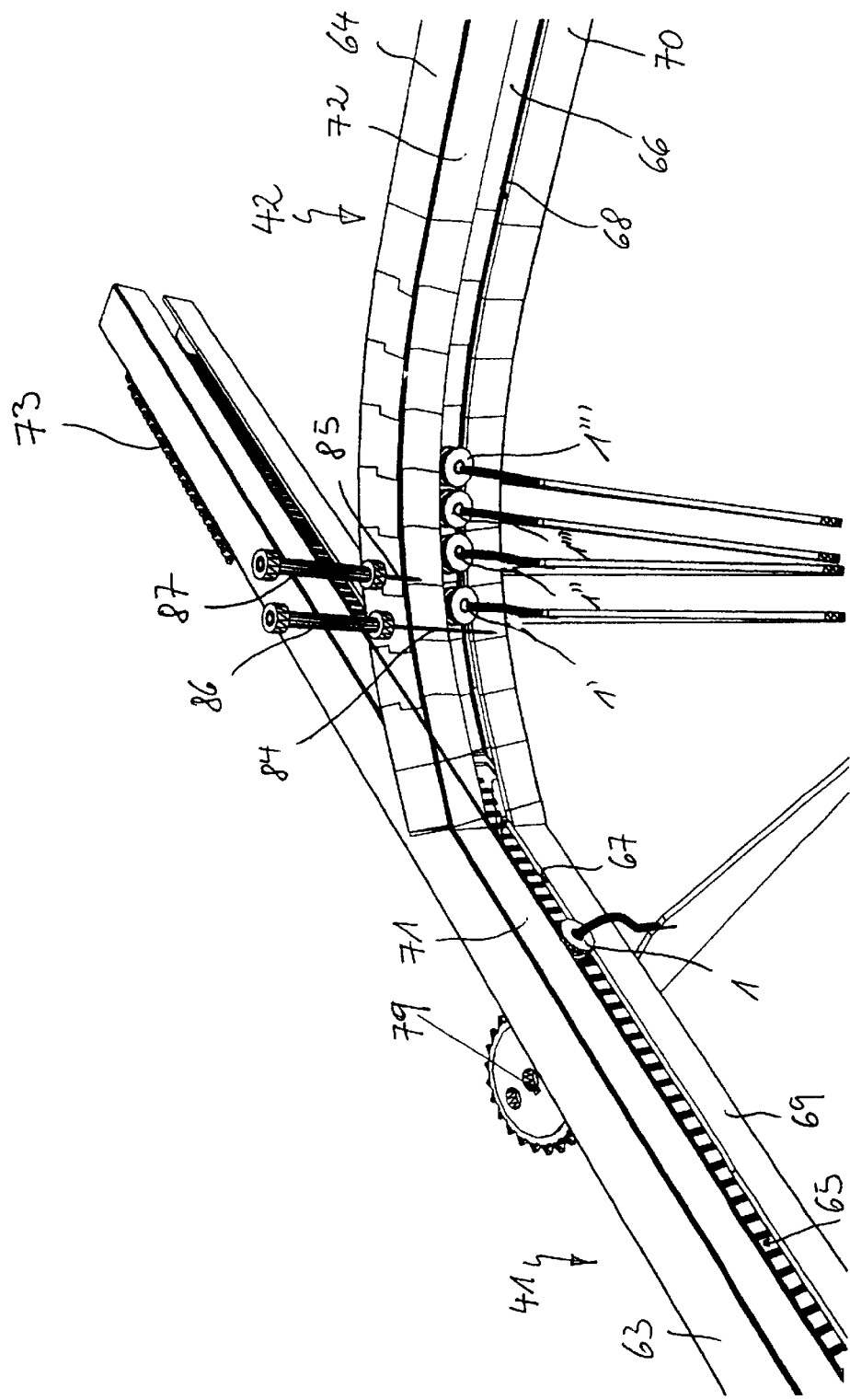

Details of the transporting installation according to FIGS. 1 and 2 can be gathered from FIGS. 3 to 5, which show the installation in detail in the region of the supply location 42.

Accordingly, the conveying path 41 and the supply location 42 comprise a respective profile rail 63, 64 with a generally C-shaped cross section. On account of the C-shaped cross section, the profile rail 63, 64 is closed all the way round apart from a respective gap 65, 66, which is bounded by the mutually facing edges of the C-shaped profile rail. Of these two edges, the bottom or upwardly oriented edge is formed as a transporting-roller running track 67, 68. The running track 67 or 68 thus forms the top side of a respective rolling ridge 69, 70, which forms one of the mutually facing ends of the C-shaped profile rail 63 with the respective gap 65, 66 located therebetween. The transporting roller 1, which is shown in FIGS. 7 to 9, FIGS. 3 to 5 showing four running-track rollers 1, 1', 1" and 1''', rides on said rolling ridge 69, 70, the central part 4 of each transporting roller being in rolling contact with the running track 67, 68, while the lateral, stationary flanges 2, 3 of each transporting roller engage over the rolling ridge 69, 70 on both sides, as a result of which the respective transporting roller is guided laterally. Additional lateral guidance for the transporting roller 1 is provided by the guide ridge 71, 72, which is located opposite the respective rolling ridge 69, 70, constitutes that end of the respective C-shaped profile 63, 64 which is located opposite the rolling ridge 69, 70 and engages between the two flanges 2, 3, albeit without coming into contact with the central part 4 of the transporting roller 1. Interacting with one another, the rolling ridge 69, 70 and the guide ridge 71, 72 thus provide lateral positive guidance for the transporting roller 1, with the result that said roller cannot pass laterally out of the profile rail 63, 64 although, in the gap 65, 66 of the latter, it can run in an essentially resistance-free manner, i.e. under rolling resistance, on the running track 67, 68. Added to this rolling resistance at most, when the goods hanging on the transporting rollers pivot laterally, is a brief contact resistance between the two flanges 2, 3 and the ridges 69 to 72.

In order to convey the transporting rollers on the essentially horizontally running conveying path 41 or in the profile rail 63, use is made of a link chain 73, which is guided via gearwheels, spaced apart in the running direction, outside (as is shown) or alternatively within, the profile rail 63 and is driven via an electromotive drive (not shown).

The motion of the link chain 73 is transmitted to the transporting rollers with the aid of a comb-like conveying mechanism 74, which runs along the gap 65 in the profile rail 63. The comb-like conveying mechanism is connected to the link chain 73 by a connecting means (not shown) which is arranged in the profile rail and, with the link chain 73 located on the outside, engages through a slot in the profile rail 63 (said slot not being shown either) located opposite the gap 65. The tines of the comb-line conveying mechanism 74 run perpendicularly to the through-passage opening 6 of the transporting rollers running in the gap 65 and perpendicularly to the transporting-roller running track 68. In the exemplary embodiment illustrated, the tines of the comb-like conveying mechanism are formed as uniformly spaced-apart carry-along pins for the free end of the hook-like carrier element 8 of the goods-securing part, e.g. in the form of a clothes hanger. The interspaces or clearances 78 of the tines or carry-along pins, of which two pins are designated 75 and 76 in FIGS. 3 to 5, and the height of these spaces are selected such that the free end of the carrier element, coming from the supply location 42, can pass into these spaces 78 and is then carried along together with the respective transporting roller and the goods hanging thereon. On account of the specific construction of the transporting roller, that flange 2 or 3 of the transporting roller which is oriented toward the interior of the profile rail engages with at least the two carry-along pins 75, 76 defining the accommodating clearance, without relative movement, and the associated friction, occurring between these parts during the conveying movement, because these flanges are fixed and do not accompany the rolling movement of the rolling part of the transporting roller, as has been explained above with reference to FIGS. 7 to 9.

The operation of transporting rollers entering into the conveying path 41 via the supply location 42 will be explained hereinbelow with reference to FIGS. 3 to 4.

As has been indicated above, the supply location 42 is defined by a profile rail 64 with a C-shaped cross section corresponding to the profile rail 63. At least in the region of the supply location 42, that is to say at the location where the profile rail 64 opens out laterally into the profile rail 63, the profile rail 64 has a downwardly sloping section, of which the lowermost point is situated at the location at which the profile rail 64 opens out into the profile rail 63. On account of this downwardly sloping section, the transporting rollers, with the clothes hangers hanging on them, which are fed into the profile rail 64 at the other end of the latter move down the downwardly sloping section under the action of gravitational force. In order for the transporting rollers 1 to 1''' to be fed into the conveying path 41 or the profile rail 63 separately and at the appropriate point in time, that is to say when a predetermined clearance 78 of the comb-like conveying mechanism 74 reaches the location at which the profile rail 64 opens out into the profile rail 63, a restraining arrangement is formed at the supply location 42 upstream of the opening-out location. This restraining arrangement comprises two restraining pins 84 and 85, which are spaced apart one behind the other in the longitudinal direction of the profile rail 64. The restraining pins 84 and 85 can have their axial position adjusted in a manner known per se by means of drive cylinders 86, 87, with the aid of which the restraining pins 84, 85 can optionally be displaced into a position in front of a respective transporting roller.

In FIG. 3, the front restraining pin 84, as seen in the conveying direction in the profile rail 64, is located in front of the leading transporting roller 1, with the result that the latter butts against the restraining pin 84, while the rear restraining pin 85 is located on the rear side of said transporting roller 1, in front of the next, trailing transporting roller 1'. The leading transporting roller 1 has thus already been separated off from the trailing transporting rollers 1', 1" and 1''', of which the roller 1' is restrained by the rear restraining pin 85, while the following transporting rollers 1", 1''' butt against one another and against the transporting roller 1'.

Starting from the position in FIG. 3, the next step is for the front restraining pin 84 then to be drawn back from its position in front of the transporting roller 1 when a restraining pin 82a, which is concealed in FIG. 3, is situated immediately in front of the location at which the profile rail 64 opens out into the profile rail 63. For this purpose, the motion of the link chain 73 is synchronized, in a manner which is not illustrated specifically, with the actuation of the drive cylinder 86 for the front restraining pin 84, e.g. by means of a synchronization gearwheel 79 which interacts with the link chain 73, with account being taken of the time which is required for the released transporting roller 1 to run out of its restrained position, with the restraining pin 84 extended, to the location at which the profile rail 64 opens out into the profile rail 63. There, the free end of the hook-like carrier element 8, which is oriented inward (toward the interior of the profile rail 63.) and projects from the through-passage opening 6 of the transporting roller, engages in the clearance 78 of the conveying mechanism 74, which is situated at the opening-out location, with the result that the transporting roller is carried along via the carrier element.

The next step, as is shown in FIG. 5, is for a further transporting roller 1'''' to run up and thus form the last transporting roller of the abutting transporting rollers 1', 1", 1''', 1'''', of which the now leading transporting roller 1' comes into abutment against the restraining pin 84, which has now been extended again, once the rear restraining pin 85 has been retracted. In order to separate the now leading transporting roller 1', the rear restraining pin 85 is extended again, and the operation of separating the leading transporting roller, the beginning of which is shown in FIG. 3, begins anew, as has been explained above.

A transporting-installation configuration which is similar to the supply location is located, for example, at the transition from the discharging lines 44 to 47 to the conveying path 41. At this location, the diverters 52 to 55, as appropriate, are formed in a manner corresponding to the profile rail 64 at the supply location 42.

Figure 6:
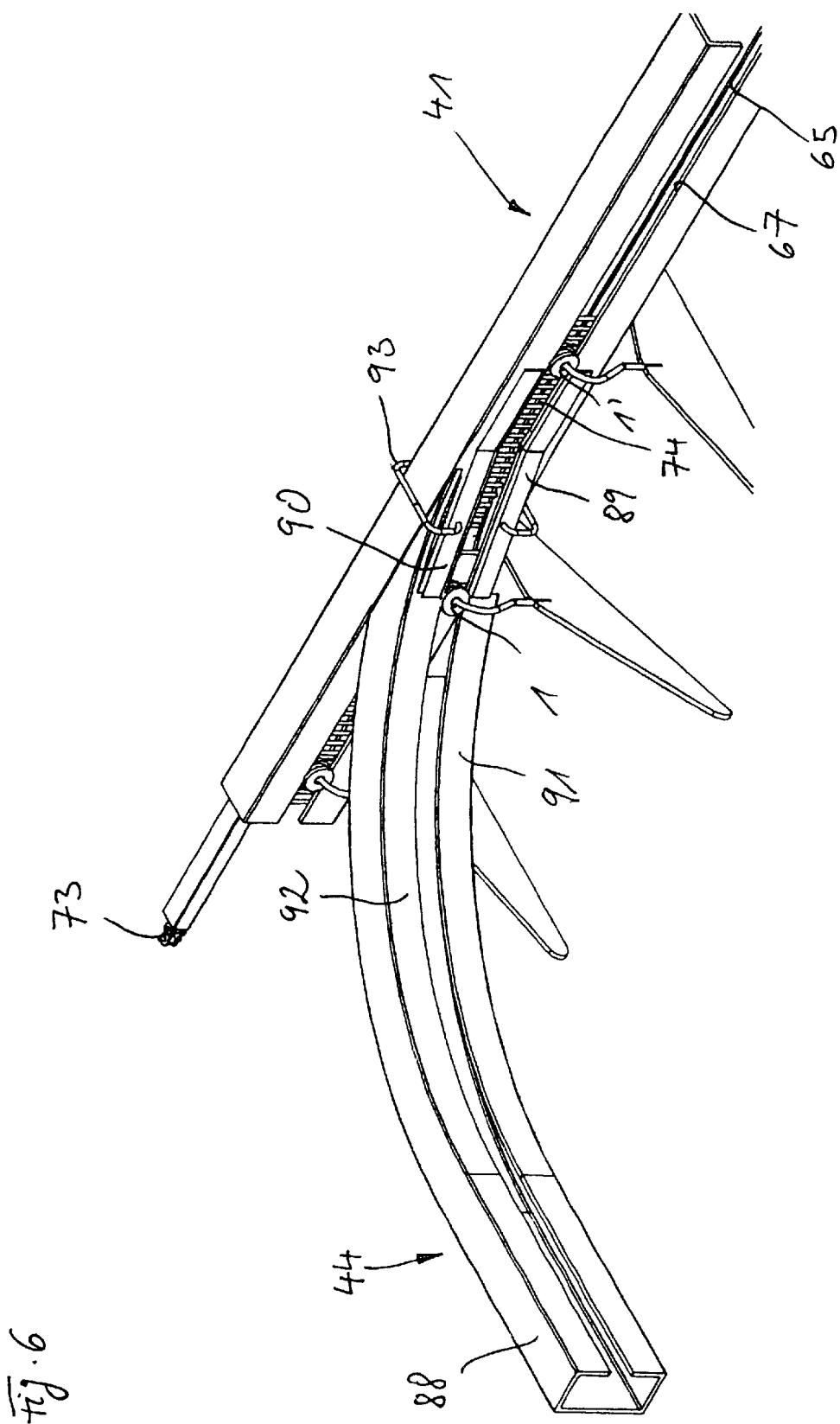
FIG. 6 shows an ejecting location of the installation of FIGS. 1 and 2, at which transporting rollers with items of clothing hanging on clothes hangers are ejected from the conveying path.

FIG. 6 shows a location for moving the transporting rollers out of the conveying path 41 onto one of the discharging lines, for example the discharging line 44 according to FIGS. 1 and 2. The discharging line 44, in turn, comprises a profile rail 88, which is curved similarly to the profile rail 64 and opens out into the conveying path. The profile rail 88 likewise opens out into the profile rail 63, which defines the conveying path 41. The profile rail 88, however, serves for ejecting transporting rollers, and the goods hanging on them, from the conveying path 41. Since not every transporting roller is to be transferred from the profile rail 63 to the profile rail 88, a diverter is formed between these two profile rails 63 and 88. This diverter comprises a rolling-ridge section 89, which is articulated pivotably on the profile rail 63, and a guide-ridge section 90, which is articulated pivotably on the profile rail 63. In the pivoted-in state, the rolling-ridge section 89 forms part of the rolling ridge 69 of the profile rail 63, while, in the pivoted-in state, the guide-ridge section 90 forms part of the guide ridge 71 of the profile rail 63. In the pivoted-out state, or when the diverter is positioned such that transporting rollers are to be ejected from the profile rail 63 onto the profile rail 88, the rolling-ridge section 89 interrupts the rolling ridge 69 and the guide-ridge section 90 interrupts the guide ridge 71, and these sections 89, 90 of the diverter, in the pivoted-out position, then adjoin a respective rolling ridge 91 and a guide ridge 92 of the profile rail 88, as a result of which transporting rollers arriving at the diverter are ejected into the profile rail 88.

In order to adjust the sections 89, 90 of the diverter, use is made of a diverter-switching mechanism 93, which is merely illustrated schematically as a C-shaped clamp.

As soon as a transporting roller located on the diverter leaves the diverter, it is transported by the downward slope on the discharging line, under the action of gravitational force, to a collecting location.

LIST OF DESIGNATIONS

1 Transporting roller
2 Second flange
3 First flange
4 Central part
5 Center axis
6 Through-passage opening
7 Securing part
8 Carrier element
11 Annular web -continued

LIST OF DESIGNATIONS

12 Inner running surface
13 Rolling body
14 Rolling body
15 Circumferential part
16 Play
17 Play
18 First groove-like depression
19 Second groove-like depression
20 Free end region
21 Disk-like side wall
22 Inner surface
23 Inner surface
24 Riveting
25 Riveting
26 Channel
27 Cutout
28 Cutout
36 Latching cutout
37 Coding arrangement
41 Conveying path
42 Supply location
43 Removal end
44 Discharging line
45 Discharging line
46 Discharging line
47 Discharging line
48 Diverter
49 Diverter
50 Diverter
51 Diverter
52 Diverter
53 Diverter
54 Diverter
55 Diverter
56 Return line
57 Diverter
58 Collecting location
59 Collecting location
60 Collecting location
61 Collecting location
62 Collecting location
63 Profile rail
64 Profile rail
65 Gap
66 Gap
67 Running track
68 Running track
69 Rolling ridge
70 Rolling ridge
71 Guide ridge
72 Guide ridge
73 Link chain
74 Conveying mechanism
75 Carry-along pin
76 Carry-along pin
78 Clearance
79 Synchronization gearwheel
84 Restraining pin
85 Restraining pin
86 Drive cylinder
87 Drive cylinder
88 Profile rail
89 Rolling-ridge section
90 Guide-ridge section
91 Rolling ridge
92 Guide ridge
93 Diverter-switching mechanism

What is claimed is:

1. Installation for transporting objects, including items of clothing hanging on clothes hangers, on conveying paths, comprising:

a transporting roller (1), said roller (1) being provided with two parallel spaced-apart flanges (2, 3) on end sides thereof, and a central part (4) located therebetween, with a through-passage opening (6) extending through a center portion of each of the flanges (2, 3) and the central part (4), the central part (4) having at least one peripheral, annular circumferential part (15) which can rotate separately from the two flanges, so that when the circumferential part (15) rotates as a result of bearing on one of the conveying paths, the two flanges (2, 3) remain in a rest state irrespective of the rotation of the circumferential part (15), a hook-shaped carrier element (8) being provided for an object which is to be transported, the hook-shaped carrier element (8) passing through the through-passage opening (6) so that a free end of the hook-shaped carrier element (8) projects outwardly therefrom, the conveying paths including a conveying path (41) having a fixed rolling ridge (69) provided with a transporting-roller running track (67) on a top side thereof, the transporting roller (1) riding on said rolling ridge (69) so that the two flanges (2, 3) of the transporting roller (1) engage laterally around the rolling ridge (69), and so that the circumferential part (15) of the transporting roller (1) engages with the transporting-roller running track (67), and a comb-shaped conveying mechanism (74) being guided along the rolling ridge (69) and being spaced apart laterally from the rolling ridge (69) by a distance at least corresponding to a thickness of the flange (2, 3) projecting there, comb-shaped conveying mechanism (74) being provided with gaps which are dimensioned for engagement therein of the free end of the hook-shaped carrier element (8).

2. The installation as claimed in claim 1, wherein the comb-shaped conveying mechanism (74) is connected to a link chain (73) running parallel to the conveying path (41), the link chain (73) being a laterally curved chain of a drive arrangement.

3. The installation as claimed in claim 2, wherein the comb-shaped conveying mechanism (74) includes tines to provide regularly spaced-apart carry-along pins (75, 76) which extend perpendicularly to the through-passage opening (6) of the transporting roller (1) and perpendicularly to the transporting-roller running track (67).

4. The installation as claimed in claim 1, wherein the rolling ridge (69) is part of a profile rail (63), the comb-shaped conveying mechanism (74) being guided in the profile rail (63).

5. The installation as claimed in claim 4, wherein the profile rail (63) has a generally C-shaped cross section, an upwardly oriented edge of the C-profile rail (63) provides the transporting-roller running track (67).

6. The installation as claimed in claim 5, wherein the comb-shaped conveying mechanism (74), by way of its tines (75, 76), spans across a full extent of a gap (65) disposed between mutually facing edges of the C-profile rail (63).

7. The installation as claimed in claim 1, wherein a supply location (42) is provided for supplying or introducing transporting rollers (1, 1', 1", 1'") into the conveying path (41), the supply location (42) having a downwardly sloping section which opens out laterally into the conveying path (41), the downwardly sloping section includes a fixed rolling ridge (70) provided with a transporting-roller running track (68) on a topside thereof, the rolling ridge (70) opening out into the rolling ridge (69) of the conveying path (41), a restraining arrangement for restraining the transporting rollers (1, 1', 1", 1'") being provided in the downwardly sloping section, on which the transporting rollers are conveyed to the conveying path (41) by an action of a gravitational force, and which can be released synchronously through a gap or clearance (78) in the comb-shaped conveying mechanism (74) in the supply location (42), whereby a period of time is required for a respective transporting roller to come into contact with the gap or clearance (78).

8. The installation as claimed in claim 7, wherein the restraining arrangement (84–87) is provided with means for individually releasing a plurality of transporting rollers positioned on the restraining arrangement.

9. The installation as claimed in claim 8, wherein the restraining arrangement (84–87) includes a restraining pin (84) for releasing a leading transporting roller (1) and a further restraining pin (85) for restraining trailing transporting rollers (1', 1", 1'"), the restraining pins (84, 85) being movable in a direction of their longitudinal axes between a restraining position in front of a respective transporting roller and a release position, in which the restraining pins (84, 85) are disengaged from the respective transporting roller.

10. The installation as claimed in claim wherein the restraining pins (84, 85) are movable essentially perpendicularly to the transporting-roller running track (68) of the downwardly sloping section.

11. The installation as claimed in claim 1, wherein the conveying path (41) includes at least one ejecting location or discharging line (44) branching off therefrom and having a downwardly sloping section, the downwardly sloping section including a fixed rolling ridge and a transporting-roller running track on a top side thereof on which transporting rollers are conveyed to a collecting location by an action of a gravitational force, the ejecting location (44) including a diverter (89, 90, 93) which can optionally be brought up to the conveying path (41) in order to transfer the transporting rollers to the downwardly sloping section of the ejecting location (44), so that the free end of the hook-shaped carrier element (8), which passes through the through-passage opening (6) thereof, is disengaged.

* * * * *